No. 877,323. PATENTED JAN. 21, 1908.
V. GELPKE & P. KUGEL.
REGULATING NOZZLE FOR TURBINES.
APPLICATION FILED OCT. 13, 1905.

WITNESSES
W. P. Burke

INVENTORS
Victor Gelpke
Paul Kugel
BY
ATTY.

UNITED STATES PATENT OFFICE.

VICTOR GELPKE, OF LUCERNE, SWITZERLAND, AND PAUL KUGEL, OF DUSSELDORF, GERMANY.

REGULATING-NOZZLE FOR TURBINES.

No. 877,323.

Specification of Letters Patent.

Patented Jan. 21, 1908.

Application filed October 13, 1905. Serial No. 282,664.

*To all whom it may concern:*

Be it known that we, VICTOR GELPKE, engineer, a citizen of the Republic of Switzerland, and PAUL KUGEL, engineer, a subject of the German Emperor, and residents, respectively, of Lucerne, Switzerland, and of 89 Graf-Adolfstrasse, Dusseldorf, Rhenish Prussia, Germany, have invented new and useful Improvements in Regulating-Nozzles for Turbines, of which the following is a specification.

Our invention relates to improvements in regulating nozzles for turbines which distinguishes itself by an especially simple construction in avoiding all rupturing of the conduit-pipe for the water. We attain these objects by the manner illustrated in the accompanying drawing, in which—

Figure 1:
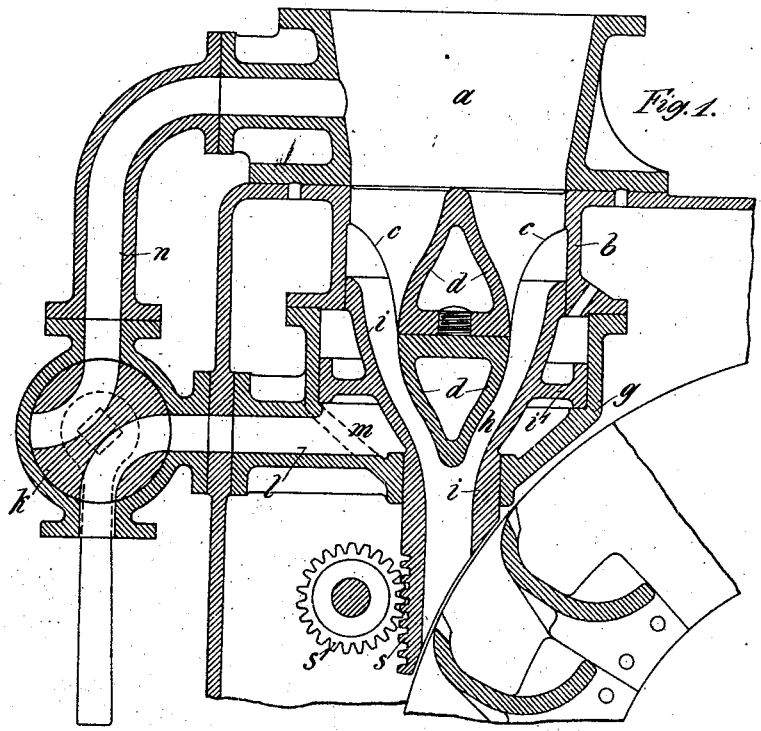
Figure 2:
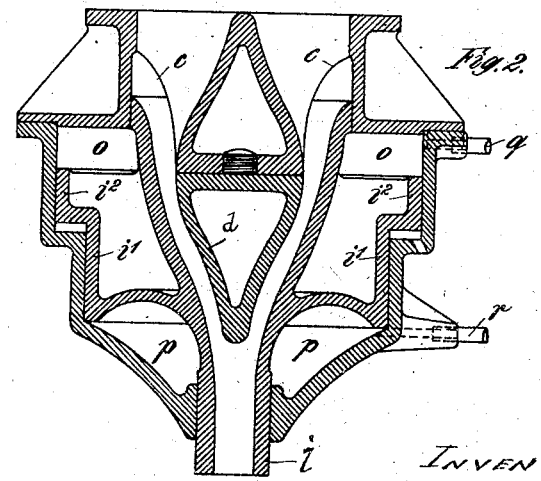

Figure 1 shows a section of the nozzle and of a part of the turbine-wheel; Fig. 2 the section of another kind of construction of the nozzle-regulating.

Similar letters refer to similar parts throughout the several views.

The nozzle-regulators used up till now with changeableness of the nozzle-gate or passage are so constructed that the nozzle-core is moved within the still-standing nozzle. The consequence is that the regulating apparatus must be set into the interior of the conduit-pipe at least partially and therefore will have to lie in the water thus being not approachable in an easy way from the outside. The present invention avoids these difficulties by leaving immovable the core of the nozzle and by moving the nozzle. The arrangement can be as shown in Fig. 1.

The conduit-pipe $a$ is joined to the cylinder $b$ which by means of ribs $c$ bears in its middle the conduit-core $d$. With the cylinder $b$ is connected a mainly cylindrical piece $g$ and between these two cylinders is the nozzle $i$ being able to be moved in the direction of the axle, however watertight towards the conduit-sides. According to the movements of the nozzle in the direction of the axle it is approaching the core $d$ or is getting away from it thus causing a change of the channel-section $h$. In the same degree as this channel-section changes the current running through the nozzle will vary.

The motion of the nozzle may be made in any way. For instance the nozzle-nose may be supplied with teeth $s$ for receiving those of a pinion $s^1$ which may be driven by the governor.

There is still another regulating shown in the sketch which works with help of the water-pressure itself. As the pressure of the streaming water tries always to push the nozzle towards the widest opening one only wants to provide the nozzle with a piston $i^1$—the active section of which is bigger than the biggest nozzle-section influenced by the streaming water—and to allow pressure water to work beneath this piston. This pressure-water will thus be able to shift the nozzle about contrary to the pressure of the streaming water and thus narrow the channel of the nozzle. The junction of the space $m$ beneath the piston $i^1$ with the pressure-water may be done through joining the conduit-pipe $a$ by means of pipes $l$ and $n$ with help of any regulating apparatus $k$. Through this regulator, which allows the water to enter the space $m$ or to let it out the nozzle will be shifted about and thus will narrow or enlarge the water-canal in the nozzle.

By this arrangement the pressure, admitted through the regulator results in closing the nozzle-section. Fig. 2 of the drawing shows an arrangement in which the constant pressure tries to shut the nozzle and the water-pressure admitted by the regulating-cock extends it. This is attained by joining the space $p$ with the conduit-pipe by means of the pipe $r$. As the section in $p$ is bigger than the section in $c$ the constant water-pressure will incline to close the nozzle. The regulator's task is then to open the nozzle what can easily be done by joining the nozzle $i$ with a piston $i^2$. The space $o$ thus gained will then according to requirement receive the water-pressure from the regulating apparatus by means of a tube $q$.

Other methods besides those shown may be used to bring the nozzle into motion and the constructive arrangement may also be different than those given here as an example. The same construction is also appliable with the same success for steam- and gas turbines.

We claim:

1. In regulating nozzle for turbines the combination with the casing and the stationary nozzle core carried by said casing, of the nozzle movable within said casing and surrounding said nozzle core and means for moving said nozzle, substantially as described.

2. In a regulating nozzle for turbines the combination with the casing and the stationary nozzle core carried thereby, of a nozzle surrounding said core and adapted to be forced away from the same by the pressure of the fluid and means for counteracting said pressure, substantially as described.

3. In a regulating nozzle for turbines the combination with the casing and the stationary nozzle core carried thereby of a nozzle surrounding said core and adapted to be forced away therefrom by the pressure of the working stream, a piston connected to said nozzle and means for admitting fluid beneath said piston, substantially as described.

4. In a regulating nozzle for turbines the combination with the cylinder and the stationary nozzle core carried thereby, of a nozzle surrounding said core sliding in said cylinder, a second cylinder, a piston flange encircling said nozzle and sliding in said second cylinder and means for admitting fluid to said second cylinder beneath said piston, substantially as described.

5. In a regulating nozzle for turbines, the combination with the casing and the stationary nozzle core carried thereby, of a nozzle surrounding said nozzle core, and adapted to slide in said casing, a piston surrounding said nozzle and means for admitting fluid to one side of said piston, substantially as described.

VICTOR GELPKE.
PAUL KUGEL.

Witnesses:
WILLIAM ESSENWEIN,
ERNEST ANDRÉ